United States Patent [19]

Märzhäuser

[11] Patent Number: 4,552,033
[45] Date of Patent: Nov. 12, 1985

[54] DRIVE SYSTEM FOR A MICROSCOPE STAGE OR THE LIKE

[75] Inventor: Heinz Märzhäuser, Wetzlar, Fed. Rep. of Germany

[73] Assignee: Gebr. Märzhäuser Wetzlar oHG, Wetzlar, Fed. Rep. of Germany

[21] Appl. No.: 598,359

[22] Filed: Apr. 12, 1984

Related U.S. Application Data

[63] Continuation of Ser. No. 269,787, Jun. 2, 1981, abandoned.

[30] Foreign Application Priority Data

Jul. 8, 1980 [DE] Fed. Rep. of Germany ....... 3025974
Oct. 6, 1980 [DE] Fed. Rep. of Germany ....... 3037710
Oct. 6, 1980 [DE] Fed. Rep. of Germany ....... 3037741

[51] Int. Cl.$^4$ .................. G05G 11/00; F16H 13/02; G02B 21/26
[52] U.S. Cl. ........................................ 74/479; 74/206; 108/143; 350/531
[58] Field of Search .................. 74/206, 479; 33/1 M; 108/143; 269/71; 350/521, 530, 531

[56] References Cited

U.S. PATENT DOCUMENTS

| | | | |
|---|---|---|---|
| 2,208,453 | 7/1940 | Forstrom | 74/206 X |
| 2,540,738 | 2/1951 | Kaplowitz | 74/206 |
| 2,731,809 | 1/1956 | Hackney | 74/206 X |
| 3,428,387 | 2/1969 | Hall et al. | 350/531 |
| 4,189,953 | 2/1980 | Volk | 108/143 X |

*Primary Examiner*—Allan D. Herrmann
*Attorney, Agent, or Firm*—Wells & Wells

[57] ABSTRACT

A drive system for slides and x-y stages in microscopes and similar instruments having the possibilities of both fine control and rapid displacement of the slides over larger distances. The drive system comprises a friction wheel and a friction track provided between the slide and the stationary slide guide. A friction wheel together with an actuation knob are solidly fixed on a common shaft and this common shaft is displaceable against a spring force so that the friction wheel is out of contact with the friction track.

9 Claims, 5 Drawing Figures

DRIVE SYSTEM FOR A MICROSCOPE STAGE OR THE LIKE

This application is a continuation, of application Ser. No. 269,787, filed June 2, 1981 now abandoned.

CROSS REFERENCE TO RELATED APPLICATIONS

Applicant claims priority under 35 USC 119 for applications U.S. Pat. Nos. 30 25 974.6; 30 37 741.4; and 30 37 710.7, filed July 8 1980, Oct. 6 1980, and Oct. 6, 1980, respectively, in the Patent Office of the Federal Republic of Germany.

BACKGROUND OF THE INVENTION

The field of the invention is drive means for the displacement of slides and the present invention is particularly concerned with the displacement of x-y stages used in microscopes and similar instruments.

It is known in the prior art to support microscope slides in roller bearings or the like, or also to support the microscope slides in glide bearings such as for instance in dovetailed guide means, and to render them displaceable by the use of rack-and-pinion drives. The pinion in these devices engages the rack, which is mounted at the side of the slide or attached to the fixed slide component in the direction of displacement. Ordinarily a knurled knob is mounted on the pinion shaft and is rotated manually, whereby the slide is moved through the intermediary of rack and pinion.

In the so-called x-y stages, two such slides are arranged in one above the other. The first of these slides can be displaced along a first coordinate axis with respect to the instrument frame and the second slide can be displaced in a second coordinate direction in relation to the first slide. The two pinions and knurled knobs are mounted on mutually coaxial shafts.

A very fine stage displacement adjustability is deliberately achieved. The purpose is to have the capability of moving into all slide directions very accurately, for instance along the optical instrument axis. On the other hand this fine control suffers from the drawback that a large number of revolutions are required to move the stage from one end position into the other. A rapid displacement of the slide or the x-y stage across large distances is impossible. This is so even when to that end the slide is itself grabbed and displaced directly. The force required in this direction is so high that even in this manner the slide can only be displaced slowly.

However, there are many applications for such slides or x-y stages where it is desired to have, in addition to the fine control of the knurled knob and the pinion, the latitude to rapidly displace the stage.

SUMMARY OF THE INVENTION

Having in mind the limitations of the prior art it is an object of the present invention to provide a drive for slides and x-y stages in microscopes and similar instruments where it is possible to have both fine control and rapid displacement of the slide means over larger distances.

This object is achieved by the present invention in a drive system comprising the following characteristics:

A friction wheel connection consisting of a friction wheel and a friction track is provided between the slide and the stationary slide guide. The friction wheel together with the actuation knob are solidly fixed on a common shaft, and this common shaft can be displaced against a spring force so that the friction wheel is out of contact with the friction track.

Accordingly a selectively actuated friction wheel drive is involved, which can be switched off by breaking the contact between the friction wheel and the friction surface. When this is the case, the slide can be freely displaced, so that it can be rapidly moved across large adjusting distances. To that end the slide is simply grabbed and displaced. As the frictional drive lacks the gear reduction of the state of the art drives, the friction wheel can be lifted at an arbitrary location and be brought down again elsewhere without incurring the danger that the teeth may sit on top of each other and/or jam.

The displacement of the common shaft may take place obliquely to the shaft axis, that is, the shaft can be tilted to lift the friction wheel. However, it is especially proposed that the displacement of the shaft take place in the axial direction and that the shape of the friction wheel and of the friction surface, and the direction of contact be designed correspondingly.

In order to ensure the frictional connection between the friction wheel and the friction track, the friction is spring-compressed against the friction track, and it is against this spring force that the shaft is displaced.

It is a feature of the present invention to provide a support means externally at the shaft guide so that the user can apply a finger of one hand, preferably the thumb, and use another finger to act on the actuation knob. By pressing these fingers together, the shaft is then displaced in a manner which does not transmit this force to the stage. The stage remains untouched and can be rapidly moved with the other hand.

As regards the x-y stage of a microscope or of a similar instrument, which consists of two slides that can be displaced in relation to each other in two different coordinates, the drive of the invention is provided for both slides. The friction wheels are coaxial within each other. Each friction wheel again can be rotated by means of an actuation knob with which it is fixed together on a common shaft. These shafts in turn are arranged in coaxial manner and are designed as a hollow shaft and a solid shaft supported herein.

In this shaft arrangement, however, it is impossible to displace the axes by a swinging motion, rather, the shafts can only be displaced axially. This axial alignment can be implemented in a simple manner in that the user grabs either of the actuation knobs and pulls or compresses it in the axial direction, depending on the design of the friction-wheel/friction-track system.

The present invention makes use of tilting levers to that end and these levers are fixed with respect to the actuation knobs and in the course of pivoting press on the activation knobs. In addition to the lesser force required by the lever effect, the displacement of the friction wheels by means of the swing levers also offers the special advantage that no force of any kind is transmitted to the slide or x-y stage. The slide or the stage is not bent to the instrument frame.

However, there is a drawback in that the swing lever must be held permanently against the spring bias when in its operational position. This means that one of the user's hands will be constantly kept busy to retain the swing lever in the actuated position, whereby only the other hand remains available for the rapid displacement of the slide.

Therefore, the present invention in a further embodiment moreover provides an indexing position for the swing lever to keep the swing lever permanently in its operational position once it is pressed into it, and it is released from position only after a particular actuation.

The indexing device consists of a spring-loaded indexing lever with an indexing beak which upon actuation of the swing lever snaps into position behind an indexing cam. Depending on the constructive design, the indexing lever is supported at the swing lever and the indexing cam is stationary, or the indexing cam is located at the swing lever and the indexing lever is supported in pivoting manner at a stationary component.

However, the emphasis is particularly in the application of the indexing device to x-y stages in microscopes and similar instruments, wherein,, as is well known, two slides are displaceable relative to each other or relative to a stationary frame or the like. As described above, the shafts supporting the friction wheels in such x-y stages are arranged in the form of a hollow and a solid shaft which are coaxial with respect to one another. One swing lever is provided for each shaft, i.e., its actuation knob, where these two swing levers must be pivoted toward each other in order to achieve contact interruption between the friction wheels and their associated friction tracks.

In this illustrative embodiment, therefore, the indexing device is arranged between the two swing levers.

Depending on the concrete embodiment, the indexing lever and the indexing cam are mounted on one and the other swing levers respectively. The remaining detail design too always is adapted to the particular embodiment so that the indexing lever will snap into position with its indexing beak behind the indexing cam and under spring bias when the two swing levers are actuated manually, that is, when they are compressed or forced apart.

Another embodiment eliminates in still another manner the drawback of having to constantly apply finger pressure to keep the spring lever(s) in the operatinal position(s). The shaft(s) no longer is (are) displaced by means of swing levers, rather in case only one common shaft must be displaced - a pin displaceable parallel to the common shaft is provided, which by one of its ends rests against a component fixed to the shaft. Furthermore, a control cam with a rising leg and a non-rising leg is provided, against which the pin rests by its other end, and provision is made for mechanical means to displace the pin. For this displacement the pin is moved from its rest position, wherein the common shaft is stationary and the friction wheel presses agsinst the friction track by means of the rising cam leg into its operational position on the non-rising cam leg, where the common shaft is moved to and where the friction wheel does not make contact with the friction track.

In particular a control cam is provided as a radial cam plate of which the non-rising leg is a curve sector concentric with the cam center and of a radius exceeding the radii of the rising cam leg. The control cam is mounted on a pivot means and the means for mechanical displacement consist of a crank lever acting on the pivot means.

Once the drive means for adjusting two mutually displaceable slides is determined, as is the case for the prior art x-y stages in microscopes and similar instruments, the present invention provides a device characterized by the following features:

two pins displaceable parallel to the hollow and solid shafts are provided, one of which rests by one end against a component fixed to the hollow shaft and the other pin by one end against a component fixed to the solid shaft. Moreover, two control cams are provided, each of the pins by its other end resting against one of these control cams, which are radial cams offset by 180° to each other on a common cam plate.

To limit the pivot range of the pivot lever, the present invention provides special means which can be adjusted for the purpose of accurately defining the pivot excursion. These means may consist for instance of a ring surrounding the pivot means and provided with a clearance within which the pivot lever can be pivoted, this clearance being adjustable and lockable with respect to the cam plate.

BRIEF DESCRIPTION OF THE DRAWINGS

The present invention is represented in the appended drawings in the form of an illustrative embodiment of an x-y stage for microscopes, wherein.

DESCRIPTION OF THE PREFERRED EMBODIMENTS

Figure 1:
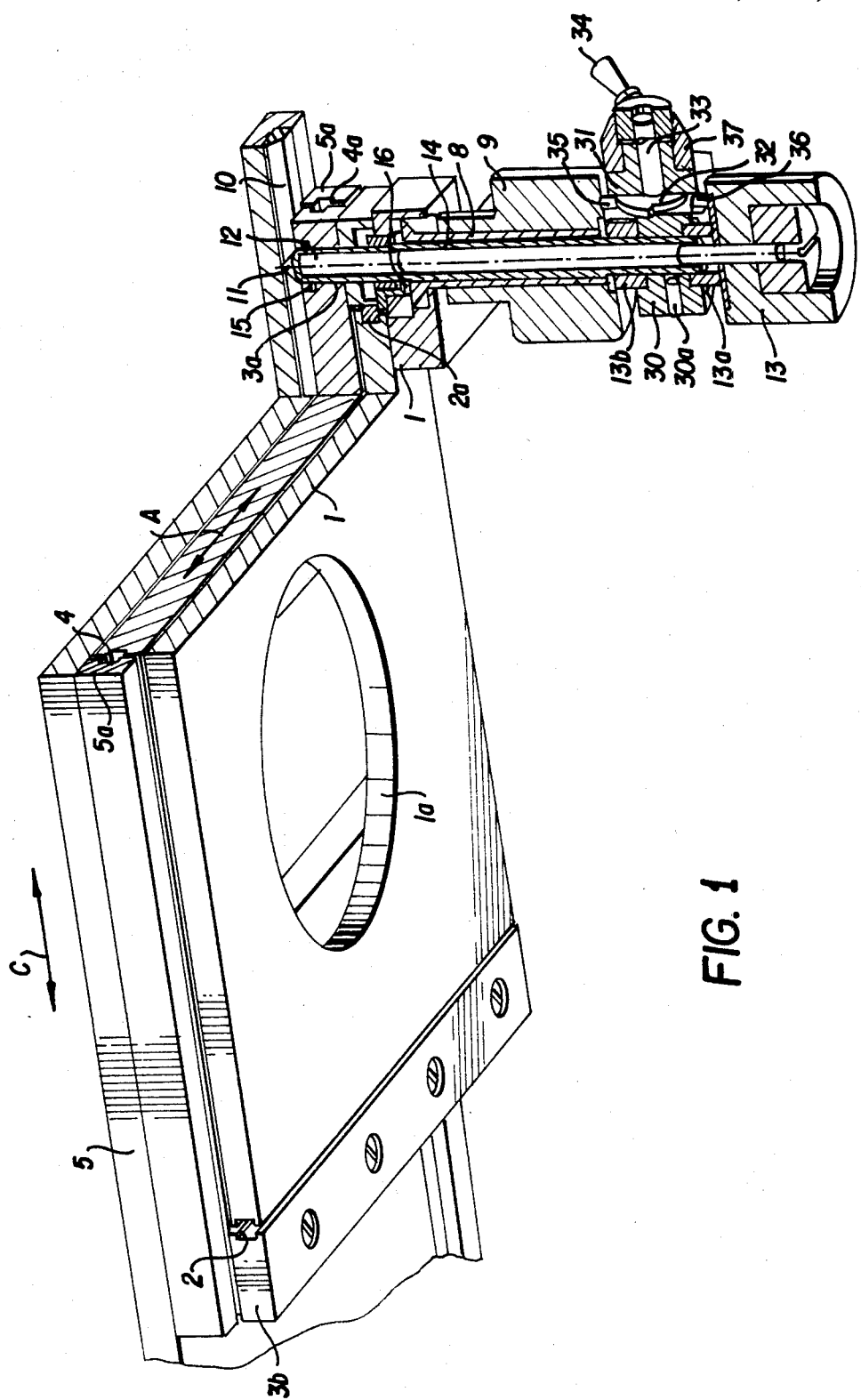
FIG. 1 is a perspective schematic showing partly in cross-section, of the x-y stage of the present invention.

With particular reference to FIG. 1, the stationary part of the x-y stage is designated 1 and it is mounted to the structure of an instrument such as a microscope.

Figure 2:
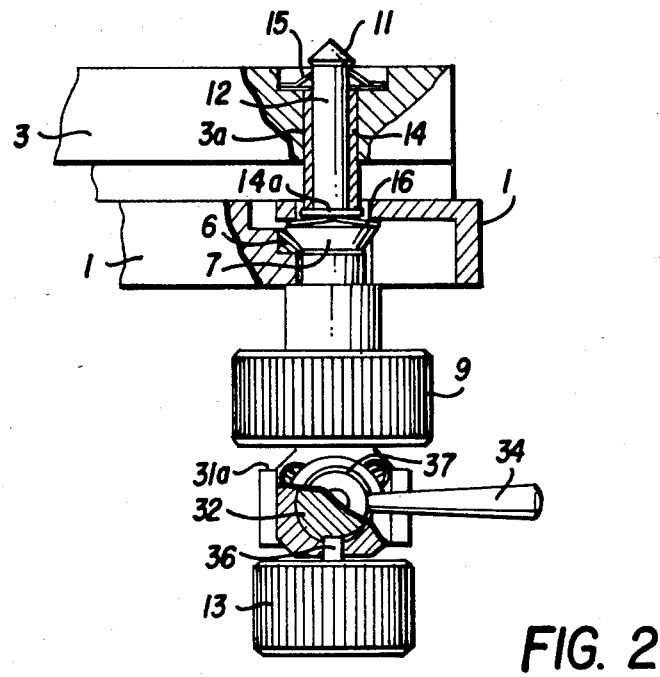
FIG. 2 is a side view, partly in cross-section, of the drive system of the present invention where the shafts are displaced by pins and control cams.

A first slide 3 is displaceably supported in rectilinear guides 2 in a first coordinate direction indicated by arrow A. A second slide 5 is supported by this first slide 3 for displacement in a second coordinate direction indicated by arrow C in rectilinear guides 4 which are essentially perpendicular to first rectilinear guides 2, 2a and second rectilinear guides 4, 4a. Guide rail 5a is one of two guide rails of second slide 5. That part of first slide 3 to the left of the end of lead line 2 is indicated by 3b. The opening in element 1 is indicated by 1a. The drive system for displacement of the first slide 3 consists of a friction track screwed tight to the stationary part 1, and of a friction wheel 7 which sits tight on a hollow shaft 8 as shown in FIG. 2. The same hollow shaft 8 seats an actuation knob 9 the rotation of which also entails the rotation of the friction wheel 7. The drive system for displacement of the second slide 5 consists of a friction track 10 mounted to the second slide 5 and of a friction wheel 11 firmly seated on the solid shaft 12. The hollow shaft 8 and the solid shaft 12 are coaxially arranged with respect to each other. A hollow spindle 14 is located between the two shafts and is fixed to the first slide 3 at 3a. This hollow spindle 14 represents the guide means both for the solid shaft 12 supported on the inside and for the hollow shaft 8 supported on the outside of spindle 14. Hollow spindle 14 carries sleeve 13a rigidly.

Each of the friction wheels 7 and 11 is subject to the action of a spring 15 and 16 respectively. Spring 15 rests on the one hand against the first slide 3 and, on the other hand, against friction wheel 11, and, therefore, in turn, via shaft 12, against knob 13. Spring 16 rests on the one hand against a small collar 14a of the hollow spindle 14, as shown in FIG. 2, and on the other hand, against the friction wheel 7 and, hence, in turn, via hollow shaft 8, against knob 9. The springs 15 and 16 therefore keep the friction wheels 7 and 11 positively pressed against their associated friction tracks.

The fine control of the x-y stage positions is carried out by rotating the actuation knobs 9 and 13. When the actuation knob 9 is rotated, the friction wheel 7 rolls on the stationary friction track 6, whereby both slides 3.5 are moved in the first coordinate direction. The actuation knobs facilitate this linear displacement.

When the actuation knob 13 is rotated, the friction wheel 11 displaces the friction track 10 together with the second slide 5 in the second coordinate direction. The actuation knobs do not participate in this linear displacement, rather they remain fixed in space.

The rapid displacement of the x-y stage is implemented in that first one of the friction wheels, or also both together, is or are lifted from the associated friction track(s) and then is or are grabbed at the stage and the slide(s) is or are rapidly displaced in the rectilinear guides. The lifting of the friction wheels from the friction tracks takes place against the opposing force of springs 15 and 16 respectively. The corresponding actuation knob can be manually acted on for the purpose of lifting, and be pulled in the axial direction.

Figure 3:
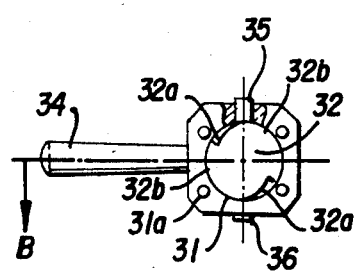
FIG. 3 is a partial bottom view of FIG. 2.
Figure 4:
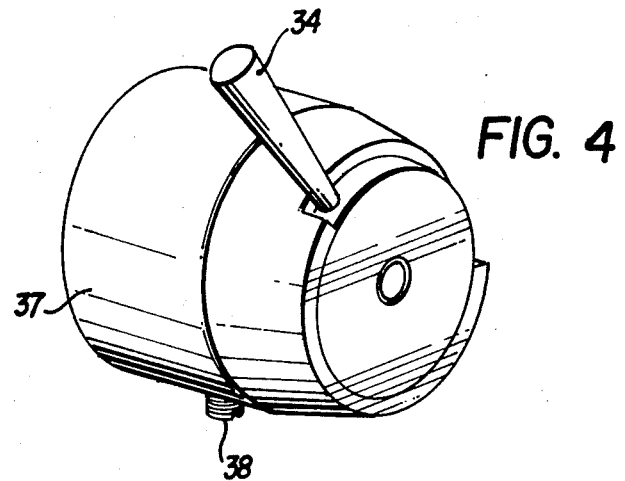
FIGS. 4 and 5 are detailed showings of ring 37 of FIG. 1.

The arrangement of FIGS. 1 through 3 is such that the friction wheels 7,11 disengage the friction tracks 6, 10 when the shafts 8,12 are displaced in opposite directions. The actuation knobs 9 and 13, which are solidly joined to the shafts, also are inherentely displaced, namely away from each other.

In order to generate the motion of the actu.

Pin 30a fastens support ring 30 on spindle 14 and below and above ring 30 spacer rings 13a and 13b are arranged. These spacer rings may or may not be fastened on spindle 14.

A radial cam plate 32 is supported between the pins 35,36 in the cam housing 31 and comprises on opposite sides a rising cam leg 32a and a level cam leg 32b concentric to the cam center, each being associated with one of the pins 35,36 (FIG. 3).

The cam plate comprises at its center an outwardly pointing pivot means 33 to which is mounted a lever 34 a perpendicular, externally projecting lever 34. This is the actuation lever of the device.

Moreover as shown in FIGS. 1, 3, 4, and 5 a slitted ring 37 is supported on a collar of the cam housing 31 and concentrically with the pivot means 33 and tightened by screw 38. The width D of the slit 39 in the ring determines the pivoting range of the lever 34. As the tightening screw 38 however can be loosened and as the ring 37 can be rotated in relation to the cam housing 31, the range of pivoting of lever 34 can be shifted as needed.

Figure 5:
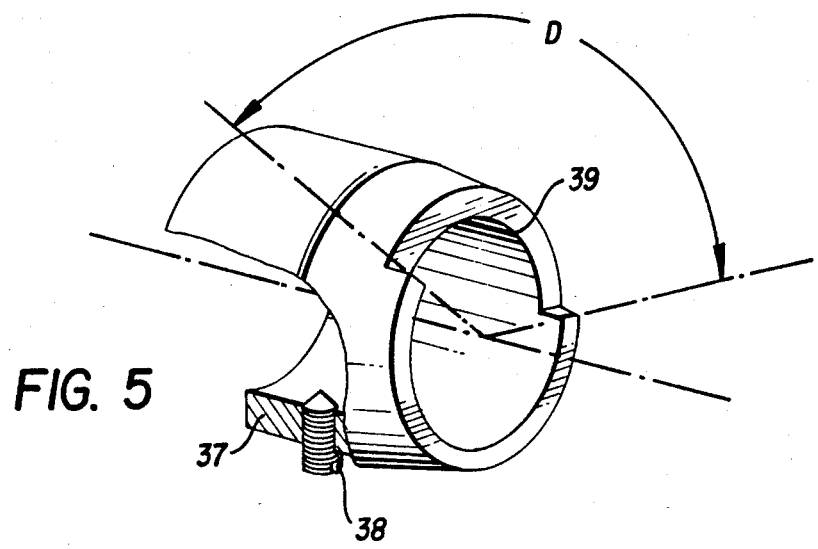

The above described components operate as follows: first, all the components assume the rest positions shown in the drawing. In these rest positions, the friction wheels 7,11 rest against their associated friction tracks. If this contact is to be eliminated so that the x-y stage is freely displaceable in all directions, then the lever 34 is pivoted by finger pressure in the direction of arrow B (FIG. 5). The range of pivoting is determined by the slit-width of ring 37.

In this pivoting the cam 37 is subjected to rotation and by its rising cam branches 32a forces the pins 35,36 apart, which in turn force the actuation knobs 9,13 apart and thereby lift the friction-wheels 7,11 from their friction tracks.

At the end of the pivoting excursion of the lever 34, the pins 35,36 always are seated on the level cam leg 32b. They remain in this position even when the finger is lifted off the lever 34 because no force component is generated at all by the concentric course of the cam legs 32b whereby the cam 32 might be forced back into its rest position. Rather, the operator has free use of both hands also now in the lifted off condition of the friction wheels 7,11 so that he can displace the stage for purposes of focusing and the like.

However, a slight finger pressure will surfice in the direction opposite the arrow B and exerted on the lever 34 to pivot it back into rest position, the pins 35,36 while being under the pressure from the actuation knobs, i.e., of the springs acting on them through the shafts sliding back on the cam legs 32a.

Thereby the actuation knobs and the friction-wheels 7,11 also slide back into their rest positions and again rest against their friction tracks.

The slitted ring 37 pivots on a collar of the cam housing 31 and can be locked to same, that is, it is adjustable so that the transition of the pins 35,36 from non-extended to extended positions can be accurately set. Then a swing of a few degrees of lever 34 suffices to switch over from the contact-making friction wheel position to the lifted-off one, and vice versa.

I claim:

1. A drive system for an x-y stage of a microscope or similar instrument having a first displaceable slide and a second slide displaceable at an angle to said first slide, first stationary slide guide means for said first displaceable slide and a second stationary slide guide means for said second slide comprising:
   (a) a friction wheel connection having first and second friction wheels (7,11) and first and second friction tracks (6,10) arranged respectively between said first slide (3) and said first stationary slide guide means (1) on the one hand and between said first slide (3) and said second slide (5);
   (b) said first friction wheel (11) having a first actuation knob (13) and a first common solid shaft (12);
   (c) said second friction wheel (7) having a second actuation knob and a second common hollow shaft (8) coaxial to said first shaft;
   (d) first and second spring force means (15,16) biasing each of said first and second shafts and respective friction wheels into contact with said friction tracks; and
   (e) means for displacing each of said shafts (8,12) against said spring force means (15,16) and in the axial direction so that said friction wheels (7,11) connected to them no longer make contact with their associated friction tracks (6,10).

2. The drive system of claim 1 wherein said friction tracks (6,10) and said friction wheels (7, 11) are arranged so that both friction wheels lose contact with their associated friction tracks (6,10) when their shafts (8,12) are displaced in the opposite axial direction.

3. The drive system of claim 1 wherein a swing lever is externally provided at said common shafts with means for pivoting against said spring force means into operational position for displacement so that both friction wheels lose contact with their friction tracks.

4. The drive system of claim 3, wherein
   (a) a pin (35,36) is provided displaceable parallel to said common shafts having one of its ends resting on a component fixed to one of said shafts;

(b) a control cam (32) is provided comprising a rising leg (32a) and a level leg (32b) against which a pin (35,36) rests by its other end; and (c) mechanical means to displace said control cam (32) are provided, said pin (35,36) in the course of this displacement being moved from its rest position in which one of said common shafts is undisplaced and said friction wheel (7,11) rests against said friction track and by mens of said rising cam leg (32a) into its operational position, on said level cam leg (32b) into which one of said common shafts is moved and where said friction wheel (7,11) is out of contact with said friction track.

5. The drive system of claim 4, wherein (a) said control cam (32) is a radial cam plate of which said level cam leg (32b) represents a sector concentric with the cam center and of a radius exceeding the radii of said rising cam leg (32a);

(b) said control cam (32) is seated on a pivot (33); and (c) said mechanical means for adjusting said control cam (32) consist of a pivot lever (34) acting on said pivot (33).

6. The drive system of claim 5 wherein means for limiting the pivot range of said pivot lever is provided.

7. The drive system of claim 6, wherein said means for the precise determination of the pivot range is adjustable.

8. The drive system of claim 7, wherein said means for the precise determination of the pivot range consist of a ring (37) surrounding said pivot (33) and comprising an opening within which said pivot lever (34) can pivot, said ring by means of said opening being adjustable with respect to said cam (32) and lockable with respect to it.

9. The drive system of claim 8, for said x-y stage of a microscope, consisting of said first displaceable slide and said second slide displaceable at an angle to said first slide, wherein:

(a) two pins (35,36) are provided which are displaceable parallel to said common shafts, one of said pins resting by one end against a component fixed to said second shaft and the other pin resting by one end against a component fixed to said first shaft;

(b) two control cams (32) are provided, each one of said pins (35,36) resting by its other end against one of said control cams; and (c) said control cams (32) are radial cams offset by 180° with respect to each other on a common cam plate.

* * * * *